(12) United States Patent
Dessloch et al.

(10) Patent No.: US 6,338,056 B1
(45) Date of Patent: Jan. 8, 2002

(54) RELATIONAL DATABASE EXTENDER THAT SUPPORTS USER-DEFINED INDEX TYPES AND USER-DEFINED SEARCH

(75) Inventors: Stefan Dessloch; Gene Y. C. Fuh; Michelle Mei-Chiou Jou; Nelson Mendonca Mattos, all of San Jose, CA (US); Raiko Nitzsche, Dranske/Rg. (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,821

(22) Filed: Apr. 22, 1999

Related U.S. Application Data
(60) Provisional application No. 60/112,296, filed on Dec. 14, 1998.

(51) Int. Cl.[7] .............................................. G06F 17/30
(52) U.S. Cl. ......................... 707/2; 3/4; 3/100; 3/102; 3/104
(58) Field of Search ................................ 707/200, 4, 3, 707/2, 5, 10, 13, 103, 1, 101, 102, 6, 205, 100; 711/153, 173, 129; 709/219, 315

(56) References Cited

U.S. PATENT DOCUMENTS
4,507,752 A   3/1985   McKenna et al. .......... 707/101

(List continued on next page.)

FOREIGN PATENT DOCUMENTS
WO    WO 97/12334    3/1997

OTHER PUBLICATIONS

Kim, Jeong–Ki et al., "Design and Performance Evaluation of a Dynamic Signature File Method for Parallel Database Environments," Chongbo Kwahakhoe Nonmunji B (Journal of the Korea Information Science Society, Section B, Software and Applications), vol. 22, Issue 12, Dec. 1995, pp. 1634–1646.

Kim, Jeong–Ki et al., "Two–Dimensional Dynamic Signature File Method Using Extendible Hashing and Frame–Slicing Techniques," Information Sciences, vol. 98, Issue 1–4, May 1997, pp. 1–26.

IBM Corporation, "DB2 Universal Database Text Extender.", Administration and Programming, Version 5, Release 2, Sep. 1998. (Diskette only).

IBM Corporation, "Reflexive Index for Relational Databases," Technical Disclosure Bulletin, vol. 36, No. 08, Aug. 1993, pp. 497–502.

(List continued on next page.)

*Primary Examiner*—Jean M. Corrielus
(74) *Attorney, Agent, or Firm*—Gates & Cooper LLP

(57) ABSTRACT

A new approach to indexing semi-structured, non-traditional data uses an external search engine accessible to a database engine through a standardized interface. An external index managed by an external search engine maps object identifiers associated with the non-traditional data to row identifiers for a table stored in the relational database. In response to a query, one or more of the object identifiers are retrieved from the external index by the external search engine. The object identifiers returned by the external search engine are then used by the database engine to retrieve one or more row identifiers from an index in the relational database. The row identifiers are then used to retrieve one or more rows from the table in the relational database.

24 Claims, 6 Drawing Sheets

U.S. PATENT DOCUMENTS

| | | | | |
|---|---|---|---|---|
| 5,627,764 A | * | 5/1997 | Schutzman et al. | 709/207 |
| 5,689,698 A | * | 11/1997 | Jones et al. | 707/4 |
| 5,696,973 A | | 12/1997 | Agrawal et al. | 717/9 |
| 5,706,496 A | | 1/1998 | Noguchi et al. | 707/3 |
| 5,754,841 A | * | 5/1998 | Carino, Jr. | 707/3 |
| 5,765,147 A | | 6/1998 | Mattos et al. | 707/4 |
| 5,778,361 A | | 7/1998 | Nanjo et al. | 707/5 |
| 5,778,378 A | | 7/1998 | Rubin | 707/103 |
| 5,784,608 A | | 7/1998 | Meske, Jr. et al. | 707/2 |
| 5,799,310 A | | 8/1998 | Anderson et al. | 707/102 |
| 5,802,524 A | * | 9/1998 | Flowers et al. | 707/103 |
| 5,809,496 A | | 9/1998 | Byrd, Jr. et al. | 707/5 |
| 5,845,278 A | | 12/1998 | Kirsch et al. | 707/3 |
| 5,893,104 A | * | 4/1999 | Srinivasan et al. | 707/102 |
| 5,930,786 A | * | 7/1999 | Carino, Jr. et al. | 707/4 |
| 6,069,627 A | * | 5/2000 | Conrad et al. | 345/347 |
| 6,085,223 A | * | 7/2000 | Carino, Jr. et al. | 709/203 |

OTHER PUBLICATIONS

IBM Corporation, "Method for Extending Index and Segmentation," Technical Disclosure Bulletin, vol. 40, No. 12, Dec. 1997, pp. 139–142.

Kaushik, S.D. et al., "Incremental Generation of Index Sets for Array Statement Execution on Distributed–Memory Machines," $7^{th}$ International Workshop on Languages and Compilers for Parallel Computing, Ithaca, Aug. 81–0, 1994, Proceedings Lecture Notes in Computer Science, vol. 892, ed. K. Pingali et al. (Berlin: Springer–Verlag, published 1995, ISBN 3–540–58868–x), pp. 251–265.

Kaushik, S.D. et al., "Compiling Array Statements for Efficient Execution on Distributed–Memory Machines: Two–Level Mappings," $8^{th}$ International Workshop on Languages and Compilers for Parallel Computing, Columbus, Aug. 10–12, 1995, LCPC '95 Proceedings Lecture Notes in Computer Science, vol. 1033, ed. C.H. Huang et al. (Berlin: Springer, published 1996, ISBN 3–540–60765–x), pp. 209–223.

Kaushik, S.D. et al., "Efficient Index Set Generation for Compiling HPF Array Statements on Distributed–memory Machines," Journal of Parallel and Distributed Computing, vol. 38, Issue 2, Nov. 1, 1996, pp. 237–247.

Kim, Jeong–Ki et al., "HPSF: A Horizonally–Divided Parallel Signature File Method", IEEE $1^{st}$ International Conference on Algorithms and Architectures for Parallel Processing, Proceedings of ICAPP '95, Brisbane, Australia, Apr. 19–21, 1995, vol. 2, pp. 559–562.

Kim, Jeong–Ki et al., "New Parallel Signature File Method for Efficient Information Retrieval," $4^{th}$ International Conference on Information and Knowledge Management, Proceedings of 1995 ACM CIKM, Nov. 28–Dec. 2, 1995, pp. 66–73.

* cited by examiner

RELATIONAL DATABASE EXTENDER THAT SUPPORTS USER-DEFINED INDEX TYPES AND USER-DEFINED SEARCH

CROSS-REFERENCE TO RELATED APPLICATIONS

This application claims the benefit under 35 U.S.C. §119 (e) of co-pending and commonly-assigned U.S. Provisional application serial No. 60/112,296, entitled "USER-DEFINED INDEX TYPES AND USER-DEFINED SEARCH FOR RELATIONAL DATABASE EXTENDERS," filed on Dec. 14,1998, by Stefan Dessloch, Gene Y. C. Fuh, Michelle M. C. Jou, Nelson M. Mattos, and Raiko Nitzsche, which application is incorporated by reference herein.

This application is related to the following co-pending and commonly-assigned patent applications:

application Ser. No. 09/112,723, entitled "SUPPORTING DATABASE INDEXES BASED ON A GENERALIZED B-TREE INDEX," filed on Jul. 9, 1998, by Gene Y. C. Fuh et al., now U.S. Pat. No. 6,219,662, which application claims the benefit of U.S. Provisional Application No. 60/052,180, entitled "USER DEFINED SEARCH IN RELATIONAL DATABASE MANAGEMENT SYSTEMS," filed on Jul. 10, 1997, by Gene Y. C. Fuh et al., application Ser. No. 09/113,976, entitled "USER-DEFINED SEARCH IN RELATIONAL DATABASE MANAGEMENT SYSTEMS," filed on Jul. 9, 1998, by Gene Y. C. Fuh, et al., now U.S. Pat. No. 6,266,663;

application Ser. No. 09/112,301, entitled "MULTIPLE-STAGE EVALUATION OF USER DEFINED PREDICATES," filed on Jul. 9, 1998, by Gene Y. C. Fuh, et al., now U.S. Pat. No. 6,192,358;

application Ser. No. 09/112,307, entitled "EXPLOITATION OF DATABASE INDEXES," filed on Jul. 9, 1998, by Gene Y. C. Fuh, et al., now U.S. Pat. No. 6,253,196;

application Ser. No. 09/113,802, entitled "RUN-TIME SUPPORT FOR USER-DEFINED INDEX RANGES AND INDEX FILTERS," filed on Jul. 9, 1998, by Michelle Jou, et al., now U.S. Pat. No. 6,285,996;

application Ser. No. 09/112,302, entitled "A FULLY INTEGRATED ARCHITECTURE FOR USER-DEFINED SEARCH," filed on Jul. 9, 1998, by Gene Y. C. Fuh, et al., now U.S. Pat. No. 6,278,994;

application Ser. No. 08/786,605, entitled "A DATABASE MANAGEMENT SYSTEM, METHOD AND PROGRAM FOR SUPPORTING THE MUTATION OF A COMPOSITE OBJECT WITHOUT READ/WRITE AND WRITE/WRITE CONFLICTS," filed on Jan. 21, 1997, by Linda G. DeMichiel, et al., now U.S. Pat. No. 5,857,182, issued Jan. 5, 1999; and application Ser. No. 08/914,394, entitled "AN OPTIMAL STORAGE MECHANISM FOR PERSISTENT OBJECTS IN DBMS," filed on Aug. 19, 1997, by Gene Y. C. Fuh, et al., now U.S. Pat. No. 6,065,013, issued May 16, 2000;

all of which are incorporated by reference herein.

BACKGROUND OF THE INVENTION

This invention relates in general to database management systems performed by computers, and in particular, to the optimization of queries in a database management system that supports extended search capabilities such as relational extenders.

DESCRIPTION OF RELATED ART

Relational database systems using a Structured Query Language (SQL) interface are well known in the art. The SQL interface has evolved into a standard language for relational database systems and has been adopted as such by both the American Nationals Standard Organization (ANSI) and the International Standards Organization (ISO).

In relational database systems, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Relational database systems have typically been used with databases comprised of traditional data types that are easily structured into tables. However, some vendors have proposed and offered relational database systems that can be used with text, images, video, audio, and other non-traditional data types. This has led to a new generation of databases, known as "object-relational databases". These databases are extensible in terms of their type system and their query language, thereby allowing the user to create new data types and functions (or methods) to accommodate the new types of contents in the database as well as to manipulate and search such content.

Most of the existing object-relational database systems provide an architecture and application programming interface (API) for integrating content management and search functions for new data types in form of "plug-ins". This gives vendors of content-specific search engines the opportunity to plug their existing systems into the database engine with minimal effort and provides database users with new data types and their advanced content search capabilities inside of SQL. However, to support the new data types efficiently, the database engine and optimizer have to be extended too, meaning they must be able to recognize and execute user-defined types and functions in the same way as built-types and functions. Furthermore, the internal index system needs to be extended in a way that it also covers user-defined data types. The internal index system of a database is not made for complex indexes over semi-structured data. Most databases just support a B-tree index, which is suitable for most of the conventional data types, such as integer and character data types. However, for semi-structured data, this index type is almost useless or at least not comparable in terms of efficiency with other index mechanisms.

One solution to support indexes for the data types would be to implement new index mechanism directly into the database engine. This would provide high performance and integration into the system. However, it also raises some problems. Which index mechanisms should a database provide? And how many different index types can a database system provide? Moreover, it is not an easy task to implement and integrate a new index mechanism into an existing database engine, because of its interaction with central database components such as locking and recovery management. And if someone finds a better mechanism to index the new data types, the database vendor would have to implement this new mechanism, too.

On the other hand, there are many third party vendors who already sell search engines for different semi-structured data types (e.g., all the different text search engines for the WWW). These vendors are more experienced in searching and indexing data such as text than the vendors of a database system, and they sometimes provide more than one index mechanism. Consequently, the solution for an extended index has to be much more flexible and should support the exploitation of content specific search engines that use external indexes.

For this reason, various approaches that address the extensibility of the index support have been developed over the last years. Some of them integrate user-defined access methods into the database. While this is probably the most effective way to enhance the index capability, this is also the most expensive one because it is actually just a generalized version of the approach from the paragraph above with the difference that the effort is shifted to the vendor of the search engine.

Thus, a new approach to the support of indexing of semi-structured data in a relational database system is required. Preferably, the database should use an External Search Engine through a standardized interface. The user could choose a preferred search machine to search and index the data stored in the database.

SUMMARY OF THE INVENTION

To overcome the limitations in the prior art described above, and to overcome other limitations that will become apparent upon reading and understanding the present specification, the present invention discloses a method, apparatus, and article of manufacture for indexing semi-structured, non-traditional data, which is stored either in a table in a relational database or in a separate file system. The present invention uses an external search engine accessible to a database engine through a standardized interface. An index stored in the relational database managed by the database engine maps object identifiers associated with the non-traditional traditional data to row identifiers for a table stored in the relational database. In response to a query, one or more of the object identifiers are retrieved from the index in the external database by the external search engine. The object identifiers returned by the external search engine are then used by the database engine to retrieve one or more row identifiers from the index in the relational database. The row identifiers are then used to retrieve one or more rows from the table in the relational database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

1. Overview

The present invention provides a new approach to supporting indexing of semi-structured data in a relational database system, wherein the database uses an External Search Engine through a standardized interface. The user can choose a preferred search machine to search and index the data stored in the database.

This gives the user more flexibility since the search engine can be exchanged if there is a better one using another algorithm or index mechanism. The user does not need to wait for a new release of the database system supporting the new technique and the database vendor does not need to implement any new algorithm and index mechanism, which, in fact, would be quite impossible to realize.

The present invention describes an approach of exploiting the search capabilities of content-specific search engines, such as full-text retrieval engines, in the database engine. The preferred embodiment of the present invention is based on the so-called Index Extension provided by DB2 UDB to extend its index capability (which is described in the related applications cited above). Using this approach, the content-specific indexing mechanism of search engines can be exploited without having to extend the database engine with new access methods, or having to break up the search engine's indexing scheme to fit into the database index structures.

This application is organized as follows. Section 2 introduces a sample scenario from the area of text databases, which serves as a running example throughout the text, and illustrates the problem being addressed with the proposed approach. Section 3 illustrates how table functions can be used to improve the performance of special queries, an approach chosen by existing data-base extension (e.g., DB2 Text Extender), and the problems that still exist with this approach. Section 4 describes the definition of index extensions and 'user-defined' predicates on a simple example for a text search extension. How the extension and the user-defined predicates can be used to exploit an external index is explained in Section 5. Additional aspects related to the index extension approach are discussed in Section 6. Implementation logic is discussed in Section 7 and Section 8 provides some final conclusions.

1.1 Hardware Environment

Figure 1:
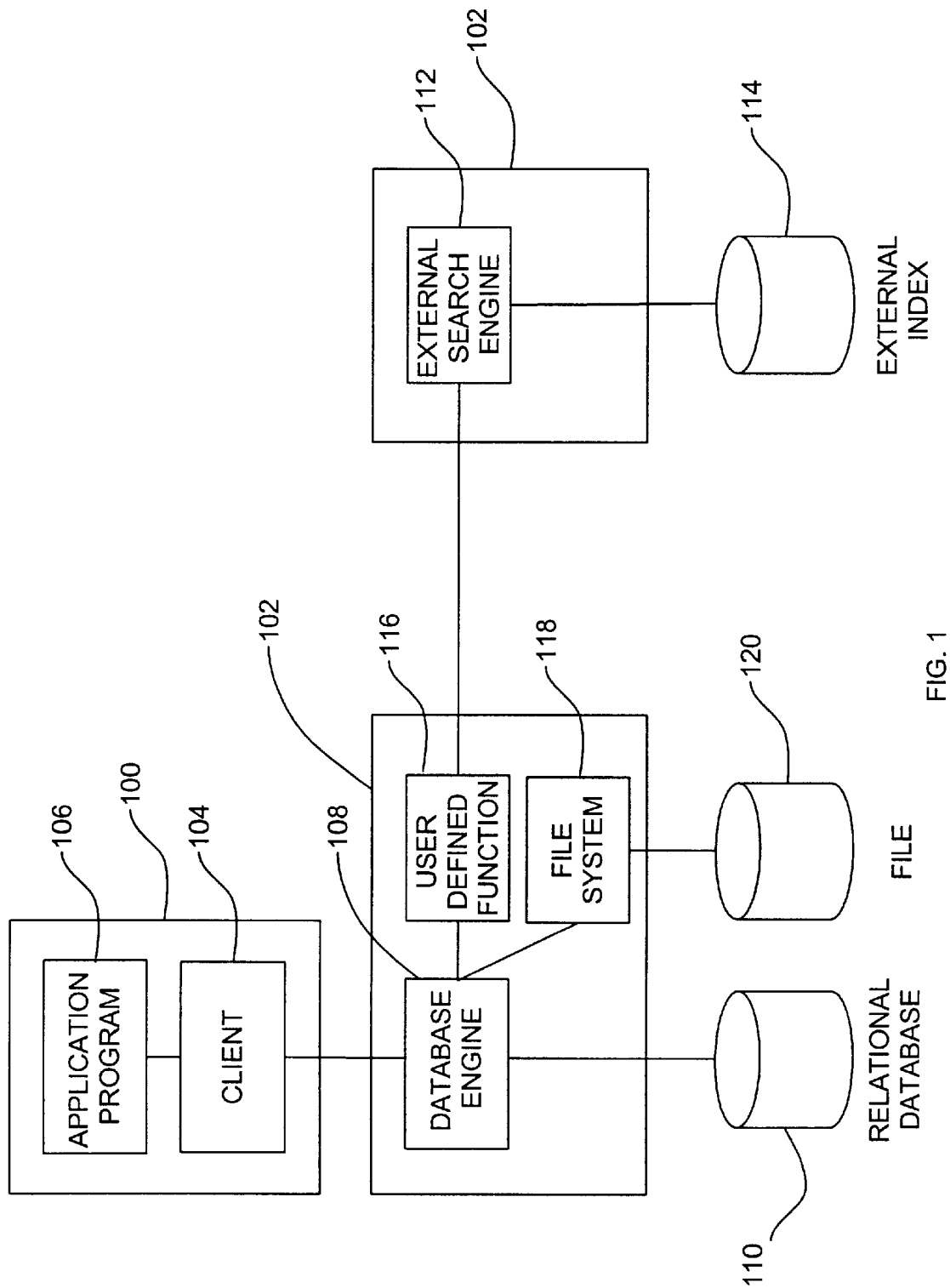
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a client/server architecture is illustrated comprising a client computer 100 coupled to one or more server computers 102. Both the client computer 100 and server computers 102 may include, inter alia, processors, random access memory (RAM), read-only memory (ROM), keyboard, display, fixed and/or removable data storage devices, and data communications devices. Those skilled in the art will recognize that any combination of the above components, or any number of different components, peripherals, and other devices, may be used with the client computer 100 and server computers 102. Those skilled in the art will also recognize that a single computer could be used, rather than multiple computers networked together.

The present invention is typically implemented using relational database system, such as the DB2 product sold by IBM Corporation, although it may be implemented with any database management system. In the example illustrated in this application, the relational database system includes a Client program 104 and Application program 106 executed by the client computer 100, a Database Engine 108 executed by one of the server computers 102, a relational database 110 managed by the Database Engine 108, an External Search Engine 112 executed by one of the server computers 102, an external index 114 managed by the External Search Engine 112, an optional File System 116 executed by one of the server computers 102, and an optional file 118 managed by the optional File System 116. These various components execute under the control of an operating system on their respective computers 100 or 102, such as MVS, UNIX, AIX, OS/2, WINDOWS, etc.

The Client program 104 and/or the Application program 106 generate commands for performing various search and retrieval functions, termed queries, against the database 110 managed by the Database Engine 108, which may invoke functions related to the external index 114 managed by the External Search Engine 112 and (optionally) the file 120 managed by the File System 118. In the preferred embodiment, these queries conform to the Structured Query Language (SQL) standard, although other types of queries could also be used without departing from the scope of the invention. The queries invoke functions such as definition, access control, interpretation, compilation, data retrieval, and update of user and system data.

Generally, the relational database system, the SQL queries, and the components thereof, are embodied in or retrievable from a device, medium, or carrier, e.g., a memory, a data storage device, a remote device coupled to the computer system by a data communications device, etc. Moreover, these instructions and/or data, when read, executed, and/or interpreted by a computer system, cause the computer system to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture" as used herein is intended to encompass instructions and/or logic and/or data embodied in or accessible from any device, carrier, or media.

Of course, those skilled in the art will recognize many modifications may be made to this configuration without departing from the scope of the present invention. In addition, those skilled in the art will recognize that any combination of the above components, or any number of different components, including computer programs, peripherals, and other devices, may be used to implement the present invention, so long as similar functions are performed thereby.

1.2 Relational Extenders

The External Search Engine 112 supplements the retrieval capabilities of the Database Engine 108. Detailed information concerning one type of External Search Engine 112 can be found in "DATABASE 2 Text Extender—Administration and Programming", IBM Corporation, June 1996, which is incorporated by reference herein.

The External Search Engine 112 may provide content-based search capabilities for non-traditional data types such as text, images, video, audio, etc. Generally, there is a different External Search Engine 112 for each data type, such as the DB2 Text Extender for text data types. Using the External Search Engine 112, users can store text, images, video, audio, etc., in tables, together with traditional data, by simply adding columns of the appropriate data types provided by the External Search Engine 112.

User-defined data types (UDTs) describe the attributes of this new data. UDTs, like built-in data types, can be used to define columns of tables and parameters of functions. Simple examples of UDTs may include text, video, and audio.

User-defined functions (UDFs) are used to define arbitrarily complex operations that can be invoked in SQL queries and executed by the relational database system. The UDFs provide the means to initialize, update, and search on UDTs. For illustration purposes, FIG. 1 shows the UDFs 116 being an interface between the Database Engine 108 and the External Search Engine 112.

Content-based searches over tables in the relational database 110 containing (or referencing) these new data types are supported efficiently within the External Search Engine 112 through the use of appropriate indexing techniques. The implementation is transparent to the user, however, who simply formulates his or her search requests as SQL queries that involve functions provided by the External Search Engine 112.

An important advantage of this approach to supporting content-based searches is that a given SQL query can search on non-traditional data types without additional programming or pre-processing steps; instead, they can be directly specified with other search criteria on other data in the same SQL query. As a result, there is essentially no limit to the ways in which SQL queries can combine non-traditional data predicates.

2. Text Searches in a Relational Database System

The support of text search in a database system is usually based on a new data type to store text information. Consider the example below using the new data type 'Full Text', wherein a table is created having a full-text column for applicants' resumes:

CREATE TABLE applicants(
    id integer,
    name varchar(50),
    address varchar(100),
    age integer,
    resume Full Text)

In addition, the relational database system has to provide functions to work with values of data type 'Full Text', including search functions. For example, the 'contains' function can be used to perform a text search on text columns in the following manner:

SELECT name, address
FROM applicants
WHERE contains(resume,
    '"database" IN SAME SENTENCE AS "optimizer"')=1

The above query would return the names and addresses of applicants whose resumes contain the words "database" and "optimizer" in the same sentence. The 'contains' function has two arguments: (1) a value of type Full Text, and (2) a search pattern. After being passed these parameters, the 'contains' function returns 1 if the text matches the pattern and 0 if not.

Note that, alternatively, it would be possible to use existing, built-in data types for character data for representing text information. Moreover, the text search UDF's can be based on such data types, rather than the Full Text data type.

The vendor of an External Search Engine 112 can supply function libraries and data definition language (DDL) statements that can be executed to create the Full Text data type, and the user can use them in the way described above.

2.1 Problem Description

It is obvious that the above SQL query involving a text search cannot be efficiently executed without some sort of an indexing scheme on the Full Text documents. Otherwise, the 'contains' function would have to be performed on the resume column for every single tuple in the applicants table, which would have a dramatic impact on the overall execution costs of this query. First, an expensive table scan would be needed to get all resumes, and then the 'contains' function must analyze for the given document whether it matches the search pattern, which would take even more time.

This type of search and indexing is well researched and available in different information and full-text retrieval search engines from various vendors (e.g., the search engines for the World Wide Web). These search engines usually support APIs to:

construct a (named) index for a collection of documents in a given scope somehow identified by the user, and search for all identifiers of documents in a certain scope (given by the index name) that match a given text search pattern.

Exactly this functionality is required for index support in a database-oriented text search. The scope would be the Full Text column and the identifier could be either the row or tuple identifier, or a unique key value given by the user (e.g., the primary key).

Given this functionality, what is required is a way to exploit this by the relational database system, without forcing the vendor of such an External Search Engine 112 to re-implement its product as a new access method for every supported database system and without trying to map its indexing and search scheme to one of the existing schemes within the database system. In both cases, the vendor would expose key technology by making it 'public' to the database index, which in most cases is not acceptable, as this is exactly the point where the products differ and the vendors compete for better performance.

The new approach has to preserve the External Search Engine 112 and make its index-based search technology applicable inside the Database Engine 108 through its APIs. In this approach, user-defined functions (e.g., 'contains') 116 would utilize the External Search Engine 112 through its standard API.

2.2 Example of a Full-Text Extension

An example of a database full-text extension is the DB2 Text Extender, which is a 'plug-in' for DB2 UDB. The Text Extender uses the functionality of user-defined types (UDTs) and user-defined functions (UDFs) provided by DB2 UDB to integrate text search into SQL. For the actual text search, the Text Extender uses an External Search Engine 112 known as Search Manager.

Using the Text Extender, the SQL statements from above look slightly different. The applicants table would now be defined as follows:

CREATE TABLE applicants(
id integer,
name varchar(50),
address varchar(100),
age integer,
resume clob,
resume_id DB2TEXTH)

The text is stored in the table in the database 110 using traditional data types for character data, such as variable length character data types or character large object. Additionally, Text Extender also allows the user to store the text outside of the database 110 as a file 120 managed by a local File System 118, in which case only a link to the file 120 is stored within the database 110. However, the techniques described herein are also applicable if the text are stored in the database 110 itself, such as through the use of structured types that are used to define a 'self-contained' Full Text data type.

Each text column in the relational database 110 is 'accompanied' by a second column of type 'DB2TEXTH', which is a user-defined distinct type. The values of this so-called handle column serve, among other things, to uniquely identify the text documents in the text column for the External Search Engine 112.

When issuing a text search query, this handle column has to be used instead of the text column itself, as shown below:

SELECT name, address
FROM applicants
WHERE contains(resume_id,
'"database" IN SAME SENTENCE AS "optimizer"')=1

If the underlying relational database 110 supports abstract data types (ADTs), these columns could be combined and the actual text would become an attribute of the ADT, as well as the identifier and all the other data stored in the identifier column. This would make the use of text columns more transparent, as one could use the same column in all SQL statements.

Referring again to FIG. 1, the basic architecture of the preferred embodiment of the present invention can be described in terms of the interaction of the Database Engine 108 with the External Search Engine 112, which helps illustrate how the above query would be evaluated.

The query is submitted via the Client program 104 to the Database Engine 108. Like every other user-defined function (UDF), the 'contains' function 116 is invoked for each row in the table being searched in the database 110 with the contents of the resume_id column, the resume identifier, and the search pattern. The 'contains' function 116 calls the External Search Engine 112, and passes it the search pattern and the name of the index associated with the text document stored inside the document handle. The External Search Engine 112 returns the result of the text search as a set of document identifiers (i.e., values of type DB2TEXTH). Given this set of identifiers, the 'contains' function 116 checks whether this set contains the document identifier that was passed to the UDF 116 and returns the appropriate result, i.e., a value of 1 if the document identifier appears in the list and a value of 0 if it does not. The Database Engine 108 checks the result of the 'contains' function 116 (comparing it with 1), and based on the outcome, constructs the query result.

Text Extender uses database 110 triggers to notify the External Search Engine 112 if new text documents are inserted into the database 110 or if existing documents are updated or deleted. The External Search Engine 112 can then use the provided document handles to locate the text documents in the database 110 and update the external index 114 according to the text document changes.

2.3 Problem Description Rephrased

Although the architecture described above permits the exploitation of the External Search Engine 112 through its API, there is no way to avoid a full table scan on the applicants table in the database 110, as could a real index. In other words, although the External Search Engine 112 already provides a set of identifiers that qualify as search results in one single call, the Database Engine 108 still fetches all rows in the table in the database 110 and calls the UDF 116 for each of those rows. The main problem, therefore, is how can a set of identifiers returned by an index lookup performed by the External Search Engine 112 be fed back into the query evaluation process of the Database Engine 108 in a way that is comparable with its own built-in index lookup and avoids a table scan. Furthermore, the mechanism to achieve this integration of results has to be externally available through an API, so that it can be utilized by any vendor that wants to integrate different types of External Search Engines 112.

3 Using Table Functions—a First Step

To overcome the mismatch of function invocations, such as a single call to the External Search Engine 112 for the actual search and multiple calls of the 'contains' UDF 116, i.e., one for each given row returning 1 or 0, and to make an existing index exploitable, the present invention provides another approach to improve the performance of the search query.

There are two different functions, although one is just a workaround for a system that does not support so-called 'table functions', which where first introduced into DB2 UDB V5.0. The basic idea is to call the External Search Engine 112 once at the beginning of the query execution, take the returned list of handles from matching documents, and produce a temporary table that contains those handles.

During query execution, there is now a base table storing the documents and the document identifiers, and a table with the document identifiers from the matching documents. All that is left to do is to join both tables over the document identifiers, where the temporary result table works as the outer table and the base table as the inner table. If there was an index created on the base table's document identifier column, an optimizer within the Database Engine 108 may choose to use this index for a join operation. In fact, this is the approach that Text Extender has chosen, making it possible to really exploit an index for a text search query.

For relational database systems that do not support table functions, such as DB2 Common Server, the workaround uses a recursive function to create the temporary table, which would result in the following query:

```
WITH rephandle (mydochandle)
  AS (SELECT db2tx.db2texth(prototypehandle)
    FROM db2tx.textcolumns
    WHERE tableschema='NITZSCHE' and
      tablename='APPLICANTS' and
      columnname='RESUME'),
  rowresultlist (resultdoclist)
  AS (SELECT handle_list(mydochandle,'"search-
      arg"')
    FROM rephandle),
  matchtable (handle, resultdoclist, cardinality, number)
  AS (SELECT handle(resultdoclist,1), resultdoclist,
      no_of_documents(resultdoclist),
    FROM rowresultlist
    WHERE no_of_documents(resultdoclist)>0
  UNION ALL
  SELECT handle(resultdoclist, number+1),
    resultdoclist, cardinality, number+1
  FROM matchtable
  WHERE number<cardinality)
SELECT name, address
FROM applicants, matchtable
WHERE resume_id=handle
```

As can be seen, this query is now much more complicated than the one using the 'contains' function 116. One problem is that the query somehow needs to pass information about the index to be used to the External Search Engine 112, in addition to the actual search pattern. This information is stored in the document identifier and in a column identifier. Because the index exists for one column, there are system tables where all the information that is common for all documents in one column are stored for every text-enabled column.

Accordingly, the query first has to access these meta-tables to access the handle for the text column which the External Search Engine 112 has to search for the text pattern. The second step performs the actual text search by invoking the External Search Engine 112 via the UDF 116 'handle_list', which returns the list of handles of these documents that match the search pattern. This list is stored in memory, and in a third step, a recursive invocation of the 'handle' function accesses the handles from the memory and produces the temporary table with a 'handle' column that contains all handles that were returned by the External Search Engine 112. The last step is selecting the interesting columns from the base table and joining them with the temporary table over the handle column and the document identifier column. This join operation will potentially use the index that is defined on the document identifier column of the base table.

Assuming the relational database system supports table functions, this query looks a little friendlier:

```
WITH rephandle (mydochandle)
  AS (SELECT db2tx.db2texthprototypehandle)
    FROM db2tx.textcolumns
    WHERE tableschema='NITZSCHE' AND
      tablename='APPLICANTS' AND
      columnname='RESUME')
SELECT name, address
FROM applicants T1, rephandle T2,
    table(db2tx.search_result(mydochandle,
      '"computer"')) T3
WHERE T1.resume_id=T3.handle
```

Using the table function, the recursive subquery from above can be avoided, because the temporary table will be created automatically by the database system, which will invoke the table function for every document identifier returned from the External Search Engine 112. That makes the query easier to write, but does not significantly decrease the effort to process the query. Furthermore, there is still the need to access the meta-table to get the handle for the text column.

Consequently, the user always has to know the right column in the base table, which is especially difficult if one works on views and not on base tables. View expansion is usually done by a query compiler within the Database Engine 108, but now the user has to keep track of all view definitions.

Another problem raised with the use of views is access rights. Normally, views are used to give special access to a particular set of information to a group of user. With this approach, users do not only have to know the base table column(s) corresponding to the view column, but also need the proper access rights.

Another drawback is that the user has to make a choice that should be made by the optimizer in the Database Engine 108. That means the user has to know what data is stored in the table and has to write the queries accordingly, either using the 'contains' UDF 116 or the 'search result' table function. Once the query is written, there is no way for the optimizer to change the way of executing the query; even worse, the optimizer does not know anything about an external index 114.

The following query illustrates the case of combined predicates:

SELECT name, address
FROM applicants
WHERE contains(resume_id,
   '"database" IN SAME SENTENCE AS
   "optimizer"')=1
   AND age<20

In the above query, where the second predicate could also reduce the set of results dramatically, the user has to know the selectivity of all predicates and then decide which syntax will lead to the best performance. Assuming the presence of an index on the 'age' column, it might be better to apply this index if the selectivity is high enough, instead of using the table search function and applying the second predicate as a join predicate.

Further, this approach lacks the support of existing query front-end tools. Usually, existing tools do not yet support the use of table functions, and even if they did, they could not support this kind of query because of the view expansion problem.

3.1 Conclusion for the Existing Approach

Although the approach used by the Text Extender can utilize an external index and actually uses a built-in index to perform the text search query, the usability of this approach suffers due to the need to access the meta-table for every text column that is involved in the query, the view expansion problem, and the missing support of automatic query generation by existing query front-end tools because the table function query is still very difficult to write. The approach presented in the following section is more transparent to the user and involves the optimizer in the query execution.

The new approach has to address the following issues:

Integration of a context-specific external search engine into a database engine by means of a standard API.

Integration of the search functionality into SQL.

Transparency for the end user.
   query independence from use of base tables or views.
   query independence from the data stored in the database.
   query independence from additional predicates.

Optimizer support.

4 Using the Index Extension 4.1 Requirements for the Exploitation of an External Index The use of an index in a relational database system can be divided in three areas: (1) index definition and maintenance, (2) index search, and (3) index exploitation. To support external indexes, the capabilities of the relational database system have to be extended in all of these areas.

First, the data definition language needs to be extended to be able to define new indexes and predicates. Second, there has to be an API for communication between the Database Engine 108 and the External Search Engine 112 for the index search. Third, for index exploitation, an optimizer within the Database Engine 108 has to recognize and handle the new 'user-defined' predicates.

Figure 2:
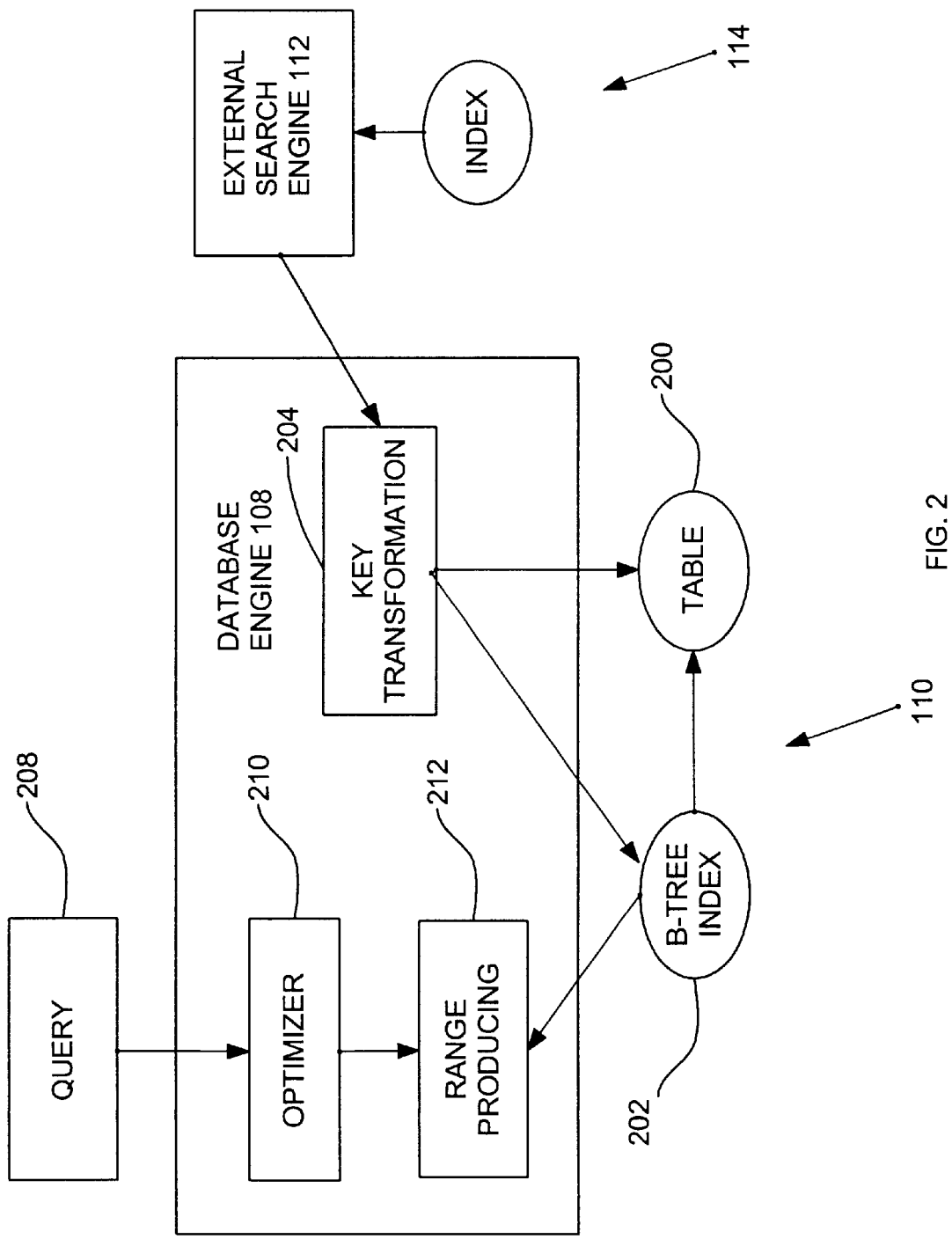
FIG. 2 illustrates some of the components of the Database Engine and describes how they could be extended to exploit an External Search Engine.

FIG. 2 illustrates some of the components of the Database Engine 108 and describes how they could be extended to exploit an External Search Engine 112. These components support the functions necessary to implement the SQL language, i.e., data definition, access control, retrieval, and update of user and system data.

First, the user creates the table 200 and associated index 202 for the table 200, both of which are stored in the database 110 and then retrieved into the Database Engine 108 (in whole or in part). The index 202 may comprise a B-tree index 202 that is created for a column in the table 200 that stores an identifier for each row in the table 200. A Key Transformation function 204 is invoked to produce the key values from the identifier, which are then stored in the B-tree index 202. Thereafter, the user may perform insert, delete and update operations against the table 200, which in turn update index 202. Moreover, the indexing process carried out by the External Search Engine 112 results in an external index 114, which stores search support information for non-traditional data values stored in the table 200 and identifies these values using the same identifiers that are stored in the index 202.

After the table 200 and index 202 are created, the predicate specification of a query 208 is analyzed in an optimizer 210 to determine whether the index 202 can be exploited in performing the query 208. If so, a Range Producing function 212 is invoked to produce start and stop key values from the external index 114, which are then used for an index scan operation against the B-tree index 202.

Generally, the optimizer 210 recognizes only basic predicates, such as '<', '>', '=', and 'like', within the predicate specification. However, the preferred embodiment of the present invention provides an extension to the syntax of the data definition language that allows the user to specify an identifier for a UDF 116 as a predicate. The optimizer 210 then recognizes the UDF 116 in the predicate specification during the analysis of the query 208, and can therefore determine whether there exists an index 202 defined on the desired column that can be exploited during the query 208, instead of invoking the UDF 116 for every row retrieved from the table 200 of the relational database 110.

Once the optimizer 210 determines there is an index 202 available, it creates an execution plan using a special scan of the B-tree index 202. During execution of the special scan, the Range Producing function 212 is invoked with the search argument from the predicate specification as an input parameter. It then invokes the search functionality of the External Search Engine 112, passing it the search argument as an input parameter, and receiving object identifiers from the External Search Engine 112 for those non-traditional data items that satisfy the given search argument.

The Range Producing function 212 returns a temporary table with two columns, wherein each object identifier received from the External Search Engine 112 appears in a single row of the temporary table as a value of both of the columns. These columns are used as start and stop key values that indicate a range for the scan of the B-tree index 202. The scan of the B-tree index 202 is then performed using these values, wherein the scan returns identifiers for all rows in the table 200 that match the search arguments.

4.2 A Simple Text Search Extension

A simple text search extension is introduced to describe the functionality and syntax of the index extension described above. This extension includes a list of key words, which can be searched for in a text column. The extension provides the ability to search all text in a given table that contains one of the key words in the list.

4.2.1 Defining an Index Extension

Using the syntax from the DB2 UDB index extension, the definitions of support functions for an index extension are provided below.

A definition of the Key Transformation function 204 is provided below:

CREATE FUNCTION TXKeyTrans(text LONG VARCHAR)
RETURNS TABLE(key VARCHAR(60))

The Key Transformation function 204 is called to produce the key values, which are stored into the B-tree index 202. Usually, the value of a specified column (or multiple columns) will be stored in the B-tree index 202, but the index extension allows the user to specify a UDF 116 that computes the index entries. The Key Transformation function 204 can return multiple key values, which would cause multiple entries of row identifiers in the index 202. In this example, the Key Transformation function 204 would return each word from a key word list as an index value that was found in 'text'. The B-tree index 202 would therefore have entries for each key word containing the row identifiers for all texts in which the key word appears.

A definition of the Range Producing function 212 is provided below:

CREATE FUNCTION TXRangeProd(
  s_arg VARCHAR(60))
RETURNS TABLE(
  key_start VARCHAR(60),
  key_stop VARCHAR(60))

The Range Producing function 212 is invoked during a scan of the B-tree index 202 to produce the start and stop key values for the lookup operation being performed on the B-tree index 202. In this example, it is only possible to look for one key word. This key word will be returned as start and stop key for an exact match. Each pair of start and stop key values returned by this function 212 results in a scan or search of the B-tree index 202 and returns the matching row identifiers for the table 200. Like the Key Transformation function 204, the Range Producing function 212 can return multiple key values.

With the use of these two functions 204 and 212, a simple text search extension can be defined as follows:

CREATE INDEX EXTENSION textidxo
  WITH INDEX KEYS for (text LONG VARCHAR)
  GENERATED BY TXKeyTrans(text)
  WITH SEARCH METHODS FOR INDEX KEYS
    (text LONG VARCHAR) WHEN containSearch (
    s_arg VARCHAR(60)) RANGE THROUGH
    TXRangeProd(s_arg)

In this example, the index extension is called 'textidx', which provides a reference name for later reference. The index extension generates keys for LONG VARCHAR values, e.g., 'text', using the Key Transformation function 204 identified as 'TXKeyTrans()'. The function 204 is called for every row within the table 204 that is included into the index 202. Furthermore, the function 204 will be called with any inserted, updated and deleted row in the table 204. Generally, the Key Transformation function 204 is used for index creation, as well as index maintenance.

In the above example, the index extension provides a search method, which is identified as the 'containSearch()' function. An index extension can provide more than one search method to adopt to different search scenarios, e.g., a spatial index extension can provide a search method to search for overlapping shapes and one for points that are within a special shape, etc. The 'containSearch()' function provides the start and stop keys for the scan of the B-tree index 202 via the Range Producing function 212, which is identified as 'TXRangeProd()'. The argument is the search string.

4.2.2 Creating an Index

To make use of the index extension textidx, the B-tree index 202 is created on the text column of the table 200:

CREATE INDEX index_on_text ON applicants
  (resume)
USING textidx()

This creates a regular B-tree index 202 on the resume column of the applicants table 200. Instead of storing the whole resume as key value in the B-tree index 202, the Key Transformation function 204 of the index extension textidx will be invoked with the resume text and its return values are stored in the B-tree index 202. Since the Key Transformation function 204 of textidx is 'TXKeyTrans()', the entries in the B-tree index 202 are words from the key word list and a resume has an entry in the index 202 for every key word contained therein. It is possible to pass additional parameters to the index extension, which will be stored with the index 202. This extension does not need extra parameters, but this is a very valuable feature for the support of external indexes 208.

4.2.3 Defining a Predicate

To be able to use the newly created B-tree index 202, the optimizer 210 has to know when it can apply this special index 202. Normally, the optimizer 210 recognizes the predicates within a query 208, and then determines whether there is an index 202 defined on the columns involved in this predicate that could be used in performing the query. Generally, a predicate comprises "age<30", "name='John Doe'", etc., and the optimizer 210 recognizes only basic operands, such as '<', '>', '=', and 'like'. Moreover, the optimizer 210 usually does not recognize UDFs as predicates, and UDFs are just executed at certain times during the query 208 execution on the rows fetched from a base table 200.

With an extension of the syntax for creating a UDF, the user is able to tell the optimizer 210 when the UDF can be considered a predicate. An example of the predicate definition for the 'contains' UDF, which identifies the 'contains' UDF as a 'user-defined' predicate that exploits the new index extension, is provided below:

CREATE FUNCTION contains(
  text LONG VARCHAR, s_arg VARCHAR(60))
RETURNS integer
  AS PREDICATE WHEN=1
  SEARCH BY INDEX EXTENSION textidx
    WHEN KEY(text) USE containSearch(s_arg)

In the above example, the search argument for the text search is passed from the 'contains' UDF to the index extension when the index is applied, and then to the Range Producing function 212.

4.2.4 Exploit the Index Extension

After the predicate is defined, a text search query that exploits the new index extension is very simple:

SELECT name, address
FROM applicants
WHERE contains(resume, '"database"')=1

Now, the optimizer 210 recognizes the 'contains' function as a predicate and can therefore determine whether an index 202 is defined on the resume column of the applicants table 200, so that the index 202 can be exploited instead of invoking the UDF for every row in the table 200. In this example, the optimizer 210 finds the 'index_on_text' index 202, and hence creates an execution plan using a special scan of the index 202. During the scan, the Range Producing function 212 is invoked with the search argument '"database"' as an input parameter and returns a table with two columns, i.e., one for the range search start key values and one for the range search stop key values. A usual scan of the index 202 only supports one range per search, but this one performs a search for every start and stop key value pair returned by the Range Producing function 212. A lookup operation for these values performed on the B-tree index 202 returns identifiers for all rows in the table 200 containing a resume that matches the search pattern. Thus, for the optimizer 210, this is an 'enhanced' scan of the index 202 associated with the applicants table 200.

4.3 Conclusion

The search functionality of this text search extension could further be extended by providing support for more than one key word search. In this embodiment, the Range Producing function 212 would return additional ranges for the extra words. This would provide the semantics for the following statement, but without the results from multiple searches of the index 202 being ORed together.

SELECT name, address
FROM applicants
WHERE contains(resume, '"database"')=1 OR
    contains(resume, '"optimizer"')=1;

However, this is all that this extension can do. More complex searches, such as the one from the Text Extender example, i.e., '"database" IN SAME SENTENCE AS "optimizer"', are not possible. Even a simple ANDing operation (i.e., two key words in one text) requires a more complex structure than that used in this example.

As can be seen, it would be too complicated to put all the functionality into the Key Transformation function 204 and the Range Producing function 212. This would also require deconstructing the index 114 structures of the External Search Engine 112 to map them to the B-tree index 202. These are issues that should be avoided with the new approach. However, the index extension provides the functionality to build a simple bridge between the Database Engine 108 and the External Search Engine 112.

4.4 Formal Syntax and Semantics Description

The new syntax of the index extension is quite powerful. This section includes a short description of the syntax, although the example described herein is not intended to be exhaustive with regard to functionality. For more information on the basic syntax, refer to the DB2 Spatial Extender product description.

The syntax for the index extension is provided below:

<create index extension>:
    CREATE INDEX EXTENSION
        <header>
        <index maintenance>
        <index search>
<header>:
    <IndexExtensionName>
        ([<ParamName><ParamType>[,]] ... )
<index maintenance>:
    WITH INDEX KEYS FOR(
        <ColName><ColType>
        [{, <ColName><ColType>} ... ])
    GENERATED BY <function invocation>
<index search>:
    WITH SEARCH METHOD FOR INDEX KEYS (
        <ColName><ColType>
        [{, <ColName><ColType>} ... ])
        {<method definition>} ...
<method definition>:
    WHEN <MethodName>
        USING (<ColName><ColType>)
            [{, <ColName><ColType>} ...
        RANGE THROUGH <function invocation>
        CHECK WITH <function invocation>
<drop index extension>:
    DROP INDEX EXTENSION <IndexExtensionName>

Some comments on the syntax above:

Instance parameter: An instance parameter is a <ParamName> defined in the <header> part of the create index extension statement.

Intuitively, instance parameters are used to support "parametric" user-defined index types. In other words, in the presence of an instance parameter, an index extension denotes a set of user-defined index types whose actual behavior can be obtained by binding instance parameters to appropriate constants.

Key source: A key source is a <ColName> defined in the <index maintenance> part of a create index extension statement. Key sources define the set of table columns which will be fed into the Key Transformation function 204 (defined below) for the generation of key values from the index 114.

Key target: A key target is a <ColName> defined in the beginning of the <index search> part of a create index extension statement. Key targets define the members of index 114 keys which are used to identify the entry in a B-tree index 202.

Key Transformation function: The Key Transformation function 204 is the <function invocation> that appears in the <index maintenance> part of the create index extension statement. It is a function over instance parameters and key sources, and returns a set of key targets as result.

Search method: A search method is an entity defined in the <method definition> part of the create index extension statement. It is comprised of four parts: a method name, a search argument, a Range Producing function 212, and an index filter which are described below.

Search argument: A search argument is a <ColName> defined in the USING clause of the <method definition> part of a create index extension statement. Intuitively, search arguments are data sources from which index 202 search ranges can be generated. Normally, search arguments are referenced in the parameter list of the function invocation of the Range Producing function 212 (described below).

Search range: A search range consists of a start key and a stop key which defines a linear range in the total order of a B-tree index 202. In the preferred embodiment, search ranges are produced by the Range Producing function 212.

Range Producing function: A Range Producing function 212 is a <function invocation> preceded by the key word RANGE THROUGH in the <method definition> part of a create index extension statement. A Range Producing function 212 is a function over instance parameters, key targets, and search arguments, and returns a set of search ranges as its output.

Index filter (function): An index filter is a <function invocation> preceded by the key word CHECK WITH in the <method definition> part of a create index extension statement. The index filter is a function over key targets, instance parameters, and search arguments, and returns an integer value as its result. When the return value is 1, the logic value TRUE is assumed and the index entry just located in the B-tree 202 is forwarded to carry out the table 200 fetch; otherwise, the logical FALSE is assumed and the index entry is discarded.

An example of using the extended syntax to create an index using a special index extension is provided below:

CREATE [UNIQUE] INDEX <IndexName> ON
   <TableName> (<ColName> [ASC|DESC]
     [{, <ColName> [ASC|DESC]} . . . ])
   USING <IndexExtensionName> (<constant>
     [{, <constant>} . . . ])

Some comments on this syntax:

The new clause is the USING clause that specifies which index extension to use.

<constant> is the instance parameter for the index extension. Since the index 202 is defined on a special column, this parameter can easily be provided at this time.

The syntax for defining a UDF 116 predicate is provided below:

<create function>:
   CREATE FUNCTION
     <FunctionName> ([[<ParamName>]<ParamType>]
     . . .)
     RETURNS <ParamType> . . . [<predicate specification>] . . .
. . .

<predicate specification>:
   AS PREDICATE
   WHEN <comparisonOp> {<constant>|EXP AS <ExpName>}
   [FILTER BY <function invocation>][<index exploitation>]

<index exploitation>:
   SEARCH BY INDEX EXTENSION
     <IndexName>
     <exploitation rule> [<exploitation rule>] . . .

<exploitation rule>:
   WHEN KEY(<ParamName> [, <ParamName>] . . . )
   USE <MethodName> (<ParamName> [, <ParamName>] . . . )

Some comments on the syntax:

Predicate specification: A predicate specification is the <predicate specification> part of a create function statement. It defines when the UDF 116 being defined is considered as a predicate (matching context), and if so, how the optimizer 210 can optimize the execution of this UDF 116 (data filter), and how this UDF 116 can be used to exploit indexes (index exploitation).

Matching context: A matching context is comprised of a comparison operator and a literal or an identifier. If the result of a UDF 116 invocation is compared with the matching literal or if the result of an UDF 116 invocation is compared with a SQL expression (represented by an identifier in the matching context) in a SQL statement, such a comparison will be recognized by the optimizer 210 as a UDF 116 predicate, and hence the optimizer 210 will attempt to take the advantage of the data filter and the index exploitation of this UDF 116 for the generation of an optimal plan.

Data filter: A data filter is the UDF 116 invocation following the key word FILTER BY in the create function statement. Intuitively, the data filter should be a "cheaper" version and an approximation of the UDF 116 being defined in the create function statement. The optimizer 210 will attempt to evaluate the data filter against the table 204 being fetched before the UDF 116 is evaluated. As a result, significant performance gains can be obtained if the filter factor of the data filter is very low.

Index exploitation: This is comprised of a set of index exploitation rules, which are defined in terms of the search method of the index extension.

Exploitation rule: An exploitation rule describes the search target(s), the search argument(s), and how the search argument(s) can be used to perform the index search for the search target(s) through a search method defined in an index extension.

Search target: A search target is an argument of the UDF 116 invocation whose actual value is passed from a simple column that is covered by some user-defined index.

Search argument: A search argument is an argument of the UDF 116 invocation whose actual value can be determined at runtime before the search target is evaluated.

5 The Index Extension Approach 5.1 Mapping of Identifiers

What is required to support an External Search Engine 112? The External Search Engine 112 uses object identifiers, e.g., handles, and stores them in its own external index 114. When a query invokes a search, the result is a list of these handles. What is still required is a mapping of these handles to row identifiers that the Database Engine 108 can use to fetch the rows from the table 200 stored in the database 110.

Probably the best solution would be to use the row identifiers for identifying the row occupied by the object in the table 200 in the database 110 and let the External Search Engine 112 store those row identifiers in the external index 114. Then, the search of the index 114 would return a list of row identifiers that the Database Engine 108 could use directly to fetch the row from the table 200 in the database 110. However, there are some concerns that make this approach not the best one.

Row identifiers are usually not exposed externally, because they are not stable, meaning they are not permanently associated with a particular row. If a table is reorganized, the rows may be assigned new identifiers and therefore all external references would have to be updated.

One would need to use stable (i.e., 'public') row identifiers, something that is not supported by all database systems, or introduce a new API to also reorganize the external reference whenever needed. In the example described herein, the impact on the External Search Engine 112 increases, since it has to implement these APIs and has to provide a transaction mechanism to inform the Database Engine 108 of such changes. Further problems appear in connection with import and export mechanisms. Usually, the creation of a more complex index for semi-structured data takes much more time than a common B-tree index 202 for basic types, and hence it is better not to synchronously couple the maintenance of the external index 114 with updates executed on the content through the Database Engine 108.

The introduction of SQL structured types for relational database systems also introduced a new kind of identifier, known as the object identifier (ID). The object ID fulfills all the requirements for a handle: it identifies exactly one row and it is stable throughout the life of the object. This means that, even after a reorganization of the database or the export and import of the database, the object ID is still the same and therefore an index 202 based on these object IDs would not need to be reorganized. Even though Text Extender is not yet using ADT, it also introduced a special identifier that acts in the same way. For every text-enabled column, there is an ID column (see resume column and resume_id column), which is created and filled when the user enables a column in the table 200 for text.

However, with these object identifiers, the Database Engine 108 is not able to directly fetch columns from a table 204, and it would have to look for those identifiers in the base table 200 or use the index 202 on the object identifier to determine the internal row-ids for the table 204. In that regard, using an object identifier does not provide any advantages for a lookup operation against the index 114, when compared to the handle-based approach.

5.2 Using the Index Extension

To exploit an external index 114, only two of the functions supported by the index extension are required. One is the Key Transformation function 204 and the other one the Range Producing function 212. The use of these functions is described above in Section 4.2.1.

The Key Transformation function 204 can actually be a function that just returns its input parameter, what would be the object identifier (e.g., the document handle in the Text Extender example). Regardless, one also can transform this identifier to any unique value. The result value of this function is stored in the B-tree index 202. The B-tree index 202 is a system index or mapping table that is maintained by the Database Engine 108, so it will always be in a correct state. Whenever an entry is inserted, updated or deleted, the B-tree index 202 will also be updated using the Key Transformation function 204.

For the maintenance of the external index 114, extra steps are necessary. For example, the Text Extender defines triggers on all text columns, as described in an earlier section. As a result, the index 114 can be out of sync with the table 200, but this is quite complicated to avoid, as the indexing process itself involves too much overhead to be performed for every change in the table 200.

At least one can avoid another important problem caused by the asynchronous existence of the table 200 and the external index 114 in the external database 114. Imagine a scenario where a user deletes a row from the table 200 and this change is not reflected immediately in the index 114 in the external database 114. Other users, or even the same user, can then submit a text search query that matches the just deleted text. The External Search Engine 112 would return a valid handle that is not reflected in table 200, because the index 114 in the external database 114 was not yet updated.

If the External Search Engine 112 stored real row identifiers in the index 114 of the external database 114 and the Database Engine 108 directly tried to fetch rows from the table 200 using the identifiers returned by the External Search Engine 112, a runtime error would result. Using the new approach with identifier mapping, this will not happen, because if the B-tree index 202 is not synchronized with the external in index 114, then the handle returned form the External Search Engine 112 will simply not be found during the lookup on the index 202, and consequently there will not be an attempt to look up the row identifier that does not exist. Moreover, since the B-tree index 202 is maintained by the Database Engine 108, and thus it is synchronized with the table 200. This works like a join operation that only returns the rows that appear in both tables 200 and 204.

The Range Producing function 212 is used for the actual search of the index 202. It works in a similar manner to the already existing table 200 value search function. It takes the prototype handle of the column in which to search and the search string, passes this information to the External Search Engine 112, and then receives the list of handles in return. The function is called a Range Producing function 212 because it should return a search range, i.e., a start and a stop value, for the search of the B-tree index 202. An exact match, as in a predicate such as "name='John Doe'", is simulated by setting the start and stop values to the same value.

In the case of External Search Engine 112, there is no range search provided, because the document identifiers are not necessarily ordered according to their contents. The Range Producing function 212 for the search of the external index 114 therefore has to return the same value for start and stop key to the Database Engine 108, which will then perform the lookup operation against the index 202 and return the appended row identifiers for the table 200. This procedure is performed for every document identifier returned by the External Search Engine 112, which leads to as many exact match lookup operations against the index 202 as there are documents qualified in the search.

Remember, if the Key Transformation function 204 really changes the values of the identifiers, then the same transformation has to be done in the Range Producing function 212, or otherwise the values will not be found in the index 202.

5.3 An Example Index Extension

Following is an example definition of an index extension for the support of an External Search Engine 112. The Key Transformation function 204 is the identity function and just returns its input parameter, which will be the document handle:

CREATE FUNCTION TXGetKey(x DB2TEXTH)
RETURNS TABLE(x_key DB2TEXTH)

For optimization purpose, this function can also perform some tasks. For example, the handle introduced by the Text Extender contains meta-information for the appended text, as well as the unique identifier, which is the only part needed to distinguish the documents. The Key Transformation function 204 can extract this unique identifier from the handle and return it as the key value. That reduces the size of the B-tree index 202 and might also increase the performance of the lookup operation. The Range Producing function 212 accepts a column handle as its input parameter, which is provided from the meta-table, and a search pattern. The result is a 'table' with start and stop values for the lookup operation against the index 202, which in this case are the same for exact match.

CREATE FUNCTION TXGetHandleSet(
    protHd DB2TEXTH,
    s_arg LONG VARCHAR)
RETURNS TABLE(
    x_start DB2TEXTH,
    x_stop DB2TEXTH)

The definition for an index extension for text search would look as follows:

CREATE INDEX EXTENSION textidx(protHd DB2TEXTH)
    WITH INDEX KEYS for (x DB2TEXTH
    GENERATED BY TXGetKey(x)
    WITH SEARCH METHODS FOR INDEX KEYS(
        x_key DB2TEXTH)
        WHEN containSearch (s_arg LONG VARCHAR)
        RANGE THROUGH TXGetHandleSet(protHd,
            s_arg)

Some comments on the extension above:

The extension's name is 'textidx' and can be referred to using this name.

This index extension has one instance parameter that has to be provided when creating an index 202 using this extension on a column of the table 200. This parameter is the column identifier from the meta-table, so that one does not have to search it again when applying the index 202.

For creation and maintenance of the index 202, this extension uses the 'TXGet-HandleSet()' function and the index 202 can be created on a column of the table 200 of the type 'DB2TEXTH'.

This extension contains just one search method for index 202 keys of the type 'DB2TEXTH'. This search method provides an additional parameter, i.e., the search argument, and invokes the 'TXGetHandleSet()' function to produce the search ranges passing the column handle, that is stored with the index 202, and the search argument, that was provided by the predicate.

5.4 Creating an Index

The statement to create an index 202 is almost the same as used for the simple text search extension, as provided below:

CREATE INDEX index_on_text ON applicants (resume_id)
USING textidx(column_handle)

This creates the new index 202 on the resume_id column of the applicants table 200 using the index extension textidx. As mentioned above in Section 4.2.2, it is possible to provide a parameter to the index 202. Since the External Search Engine 112 needs a column identifier, this one can be a parameter of the index 202 and would therefore always be available when needed. The parameter 'column_handle' has to be provided by the Application program 106 that calls this statement by either fetching it from the meta-table or computing it itself.

5.5 Defining a Predicate

Content specific extenders already provide special UDFs to support the search functionality of the External Search Engine 112 from inside SQL. For example, the DB2 Text Extender defines the UDF 'contains' as described in Section 2.2. With the extra predicate definition added to the UDF definition, existing queries do not need to be rewritten in order to exploit the new index extension. If the system recognizes an index 202 defined on the first parameter of the 'contains' function, it will use the index extension instead of invoking the UDF for each row.

CREATE FUNCTION contains(
  text_id DB2TEXTH,
  s_arg LONG VARCHAR)
RETURNS integer
  AS PREDICATE WHEN=1
  SEARCH BY INDEX EXTENSION textidx
    WHEN KEY(text_id) USE containSearch(s_arg)

As in the example text search extension from the previous section, the search argument for the text search is passed from the UDF 116 to the index extension to the Range Producing function 212, which finally invokes the External Search Engine. 112 using this search argument. The 'text_id' value is not needed if the index 202 is exploited, because it is replaced by the column handle that is stored with the index 202.

5.6 Exploitation of the Text Index Extension

Returning to the text search query from the beginning, the following describes how it is executed after the index extension and the predicate are defined:

SELECT name, address
FROM applicants
WHERE contains(resume_id,
  '"database" IN SAME SENTENCE AS "optimizer"')=1

The optimizer 210 of the Database Engine 108 recognizes the 'contains' function as a user-defined predicate and will therefore look for an index 202 defined on the resume_id column of the applicants table 200. The optimizer 210 will find the 'index_on_text' index 202, and hence will create an execution plan using a special scan or lookup operation against the index 202. During execution of the scan, the Range Producing function TXGetHandleSet() 212 will be invoked first, with the column handle stored as an index 202 parameter and the search argument '"database" IN SAME SENTENCE AS "optimizer"' as input parameters. The functionality of TXGetHandleSet() is the same as the table function provided by the Text Extender, with the only difference being the output, which will be a table with two columns for the range search start and stop values, instead of just a one column for document handles. The lookup operation performed against the B-tree index 202 will return the row identifiers for all rows in the table 200 containing a resume that matches the search pattern. Using these row identifiers, the particular rows will be fetched from the table 200.

The problem with two predicates in the WHERE clause is that the user has to know the selectivity of each predicate, and then decide whether to use the table search function or the regular UDF for the text search. Consider the following query:

SELECT name, address
FROM applicants
WHERE contains(resume_id,
  '"database" IN SAME SENTENCE AS "optimizer"')=1
  AND age<20

Assuming the optimizer 210 has all the information about the table 200 and the cost of a UDF invocation, which it usually gets from the statistics that are held for the database 110, the optimizer 210 is now able to decide, based on the estimated costs, to either apply the external index 114, or if defined, the B-tree index 202 on the 'age' column of the table 200. This provides total transparency to the user who has to write the query, since no specific knowledge about the actual data in the database 110 is needed. The same query applies for all kind of data and the optimizer 210 decides how to proceed with this query depending on the actual database 110 content.

Regarding the transparency of the usage of views instead of base tables 200, the new index 202 works like every other index provided by a database system. The user does not have to care about the view definition. If 'resume_id' is a column of a view instead of a table 200, it would be already expanded by the Database Engine 108 and therefore the optimizer 210 would find the original column instead of the view column when it checks for any defined index 202 on the columns in the query 208. Moreover, the user does not need to know what actual column in what base table 200 provides the data for a given view column, because there is no need anymore to provide the column handle explicitly in the query 208. The column handle is stored with the index 202 connected to that text column and is therewith available as soon as the index 202 gets applied.

6 Further Discussion 6.1 Optimizer Considerations

An advantage of the index extension approach is its extensive usage of the optimizer 210 capabilities, since it actually just provides a new scan mechanism for a table 200. The decision whether or not to apply an external index 114 is completely in the hands of the optimizer 210. The decision is based on additional cost information, as with UDF execution. Several existing database systems already provide a mechanism for specifying such cost information, which can be used for this purpose.

The impact of the approach presented here on the overall performance of the query 208 execution is apparent in additional execution plans that have to be considered by the optimizer 210. This is actually the same impact of any additional index.

6.2 Generalization for Arbitrary Predicates

The preferred embodiment supports UDFs that return a Boolean value (1=TRUE, 0=FALSE). However, what if a UDF returns other (numeric or non-numeric) values and appears as an operand of an arbitrary predicate?

For example, consider the following definition for the UDF 'rank':

```
CREATE FUNCTION rank(
    text_id DB2TEXTH,
    s_arg long varchar)
RETURNS double
```

This function behaves in a manner similar to the 'contains' function, but returns a rank value describing how well the text matches the search criteria, instead of a Boolean value. For example, consider the following query:

```
SELECT name, address
FROM applicants
WHERE rank(resume_id,
    '"database" IN SAME SENTENCE AS "optimizer"')
    >0.5
```

The above query would retrieve all text information for documents that match the given search argument with a rank value better than 0.5 (rank values range between 0 and 1).

With the current approach, this function is not easy to implement. The problem is that the whole predicate will be replaced by an index 202 lookup that does not provide any additional values. The easiest way to provide these values is to redefine the 'rank' UDF and to change the syntax of such a call.

Consider a new definition of the 'rank' function as provided below:

```
CREATE FUNCTION rank(
    text_id DB2TEXTH,
    s_arg long varchar,
    op char,
    value double)
RETURNS double
```

The semantics of the above function include the additional 'op' and 'value' parameters, wherein the 'op' parameter could be a string indicator of an operator, such as '<', '>' or '='. With these semantics and operators, the 'rank' function would now behave exactly as the 'contains' function, wherein a value of 1 is returned if the text matches the search pattern as well as the comparison with the 'value', which means that such functions are mapped back to Boolean functions. The comparison operation can either be performed within the UDF 116 or the Range Producing function 212 in the case that the index scan is chosen by the optimizer 210, or it can be passed to the External Search Engine 112, if the API of the External Search Engine 112 supports this. However, this solution would again restrict the transparency for the user and thus reduce its usability.

An automatic rewrite from one syntax to the another syntax could be performed. However, the new syntax is only needed for the index 202 search where the actual 'rank' UDF 116 is not called. During an index scan, the Range Producing function 212 replaces the original LDF 116, and hence one does not need a new syntax and semantics for the 'rank' UDF 116, but for the Range Producing function 212.

The new definition of this UDF 116 is as follows:

```
CREATE FUNCTION TXGetHandleSet(
    protHd DB2TEXTH,
    s_arg LONG VARCHAR,
    op CHAR, value DOUBLE)
RETURNS table(x_start DB2TEXTH, x_stop DB2TEXTH)
```

The above semantics for the UDF 116 are equivalent to those described above for the 'rank' function.

A mechanism for obtaining the additionally required parameters (op, value) is available through the syntax for defining a predicate, which allows more than just comparison with a constant value. Using the syntax "EXP AS <ExpName>", the value to compare can be assigned to a parameter name and then be passed to the UDF 116. Because the comparison operand is not variable in this syntax, multiple predicate definitions need to be provided.

The new function and index extension definition could be the following:

```
CREATE FUNCTION rank(
    text_id DB2TEXTH,
    s_arg LONG VARCHAR)
RETURNS INTEGER
    AS PREDICATE WHEN=EXP AS value
        SEARCH BY INDEX EXTENSION textidx
            WHEN KEY(text_id)
            USE containSearch(s_arg, '=', value)
    AS PREDICATE WHEN>EXP AS value
        SEARCH BY INDEX EXTENSION textidx
            WHEN KEY(text_id)
            USE containSearch(s_arg, '>', value)
    AS PREDICATE WHEN<EXP AS value
        SEARCH BY INDEX EXTENSION textidx
            WHEN KEY(text_id)
            USE containSearch(s_arg, '<', value)
CREATE INDEX EXTENSION textidx(protHd DB2TEXTH)
    WITH INDEX KEYS for (x DB2TEXTH)
        GENERATED BY TXGetKey(x)
    WITH SEARCH METHODS
        FOR INDEX KEYS (x_key DB2TEXTH)
            WHEN containSearch (
                s_arg LONG VARCHAR,
                op CHAR,
                value DOUBLE)
            RANGE THROUGH
                TXGetHandleSet(protHd, s_arg, op, value)
```

The changes include the addition of '=EXP AS value', '>EXP AS value', '<EXP AS value', as well as the operator strings or characters and values passed to the 'containSearch' functions and the TXGetHandleSet function.

It would be desirable to have a reference to the <comparison Operator> to pass it directly into a search method, instead of the multiple predicate definitions, but so far this is not supported by the index extension.

7 Implementation Logic

FIGS. 3–6 illustrate the logic performed according to the preferred embodiment of the present invention.

7.1 Creation of an Index

Figure 3:
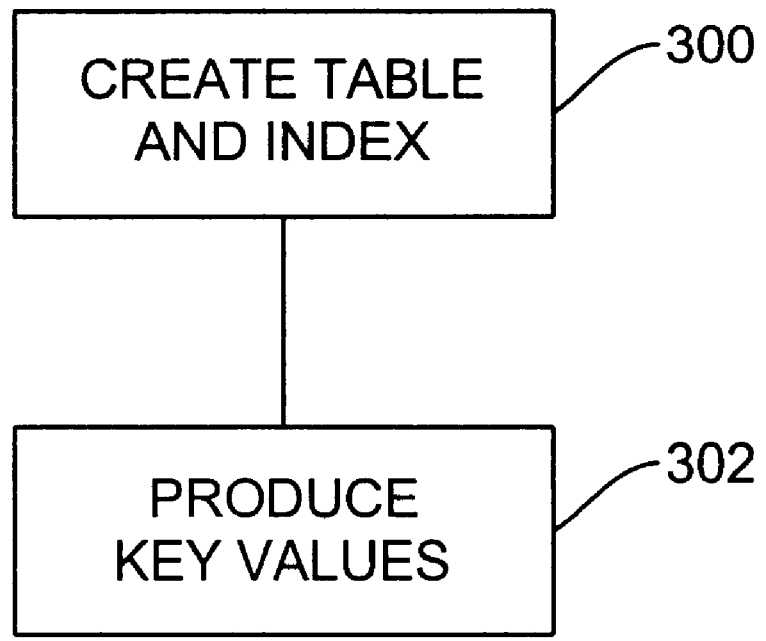
FIG. 3 is a flowchart illustrating a method of creating an index according to the preferred embodiment of the present invention.

FIG. 3 is a flowchart illustrating a method of creating an index according to the preferred embodiment of the present invention.

Block 300 represents the Database Engine 108 creating the table 200 and associated index 202 for the table 200, both of which are stored in the database 110. The index 202 may comprise a B-tree index 202 that is created for a column in the table 200 that stores a key value, i.e., object identifier, for each row in the table 204 stored in the external database 114.

Block 302 represents the Database Engine 108 invoking a Key Transformation function 204 to produce the key values from the index 114 of the table 204 stored in the external database 114, wherein these key values are then stored in the table 202 and the B-tree index 202. Thereafter, the user may perform insert, delete and update operations against the tables 200 or 204, which in turn may update index 202 or 208.

7.2 Interpretation and Execution of SQL Queries

Figure 4:
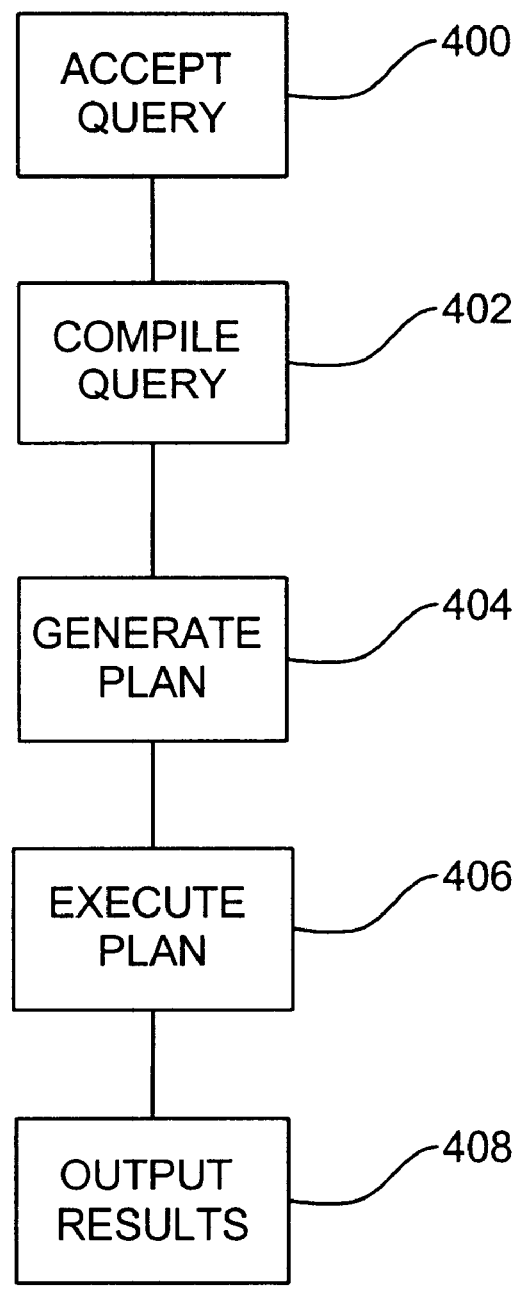
FIG. 4 is a flowchart illustrating the steps performed by the Database Engine program in the interpretation and execution of SQL queries.

FIG. 4 is a flowchart illustrating the steps performed by the Database Engine program 108 in the interpretation and execution of SQL queries 208. These steps represent the general logic performed for processing SQL queries 208, regardless of its method of input, i.e., interactive, embedded in source code, or invoked via call level interface.

Block 400 represents the input of an SQL query 208 into the Database Engine 108.

Block 402 represents the Database Engine 108 compiling or interpreting the SQL query 208. An optimizer 210 function within block 402 may transform the SQL query 208 in a manner described in more detail earlier in this specification.

Block 404 represents the Database Engine 108 generating a compiled set of runtime structures called an application plan or execution plan from the compiled SQL query 208. Generally, the SQL query 208 received as input from the user specifies only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query 208.

Block 406 represents the Database Engine 108 executing the application plan, and block 408 represents the Database Engine 108 outputting the results of the executed application plan to the Client program 104.

7.3 Optimization of a Query

Figure 5:
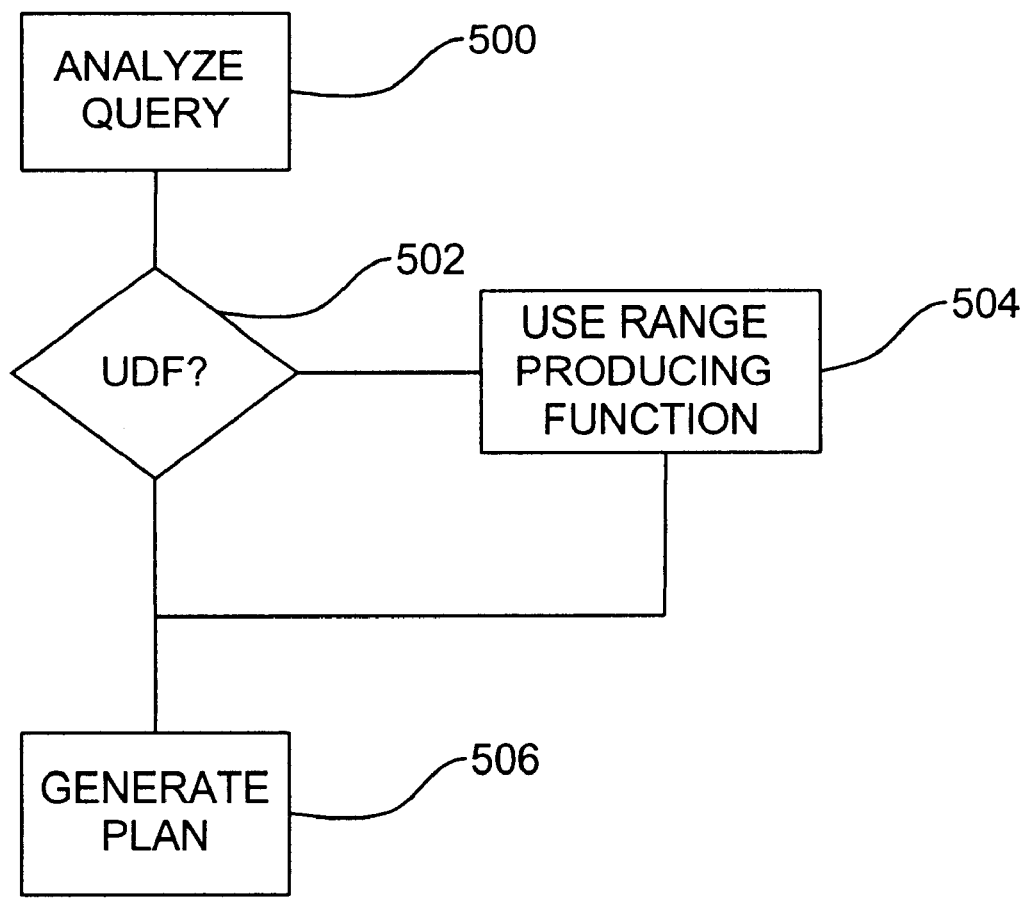
FIG. 5 is a flowchart illustrating the method of optimizing SQL queries and generating application plans according to the preferred embodiment of the present invention.

FIG. 5 is a flowchart illustrating the method of optimizing SQL queries 208 and generating application plans according to the preferred embodiment of the present invention at steps 402 and 404 in FIG. 4.

Block 502 represents the optimizer 210 function of the Database Engine 108 analyzing the predicate specification of the SQL query 208 to determine whether it includes the UDF 116 as a predicate, so that the index 202 can be exploited in performing the query 208. If so, control transfers to Block 504; otherwise, control transfers to Block 506.

Block 504 represents the optimizer 210 indicating the application plan should used the Range Producing function 212 to produce start and stop key values from the index 114 of the table 204 stored in the external database 114 for a scan operation being performed against the B-tree index 202 of the table 200 stored in the database 110.

Block 506 represents the optimizer 210 creating the application plan.

7.4 Execution of a Query

Figure 6:
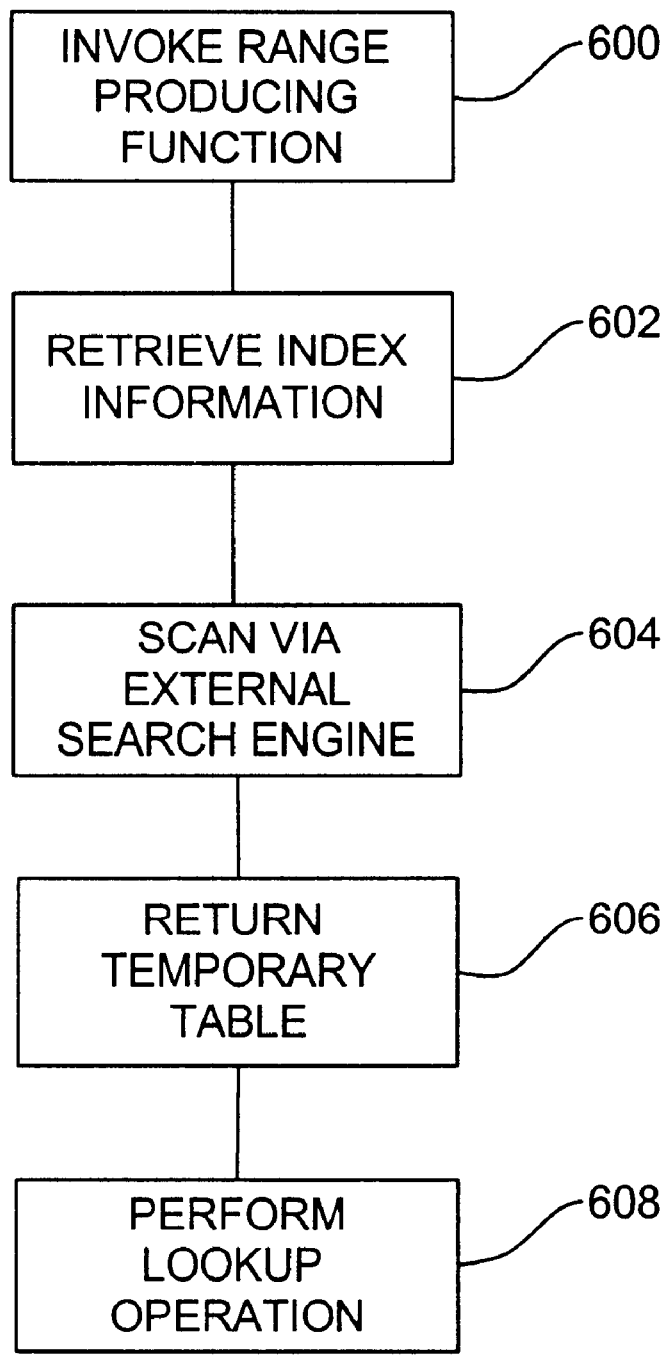
FIG. 6 is a flowchart illustrating the method of performing an SQL query according to the preferred embodiment of the present invention.

FIG. 6 is a flowchart illustrating the method of performing an SQL query 208 according to the preferred embodiment of the present invention at step 406 in FIG. 4, wherein the SQL query 208 has been optimized as described in FIG. 5.

Block 600 represents the Range Producing function 212 being invoked with the search argument from the predicate specification as an input parameter.

Block 602 represents the Range Producing function 212 the index information, e.g., the name of the index associated with the column being referenced in the query 208. This column is typically identified by a schema name, table name, and the name of the column.

Block 604 represents the Range Producing function 212 interfacing to the External Search Engine 112 to perform a scan operation against the index 114 in the external database.

Block 606 represents the Range Producing function 212 returning a temporary table with two columns from the index 114 to the table 204 in the external database 110. These columns store start and stop key values that indicate a range for the scan of the B-tree index 202.

Block 608 represents the Database Engine 108 performing a lookup or scanning operation against the index 202 of the relational database 110. The Database Engine 108 constructs a result table from the lookup or scanning operation against the B-tree index 202, wherein the result table contains identifiers for all rows in the table 200 in the relational database 110 that match the search arguments.

8. Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program providing database management functions could benefit from the present invention.

In summary, the present invention discloses a method, system, and article of manufacture for indexing semi-structured, non-traditional data. The present invention uses an external search engine accessible to a database engine through a standardized interface. An index stored in a relational database managed by the database engine maps object identifiers associated with the non-traditional data, which is stored in a table in an external database managed by the external search engine, to row identifiers for a table stored in the relational database. In response to a query, one or more of the object identifiers are retrieved from the index in the external database by the external search engine. The object identifiers returned by the external search engine are then used by the database engine to retrieve one or more row identifiers from the index in the relational database. The row identifiers are then used to retrieve one or more rows from the table in the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for managing data, comprising:
  a database management system, executed by a computer, for managing a database storing at least one table and an associated index that is related to search results returned by an external search engine that supports content-specific search operations against an external database, wherein the database management system interfaces to the external search engine, the database management system retrieves one or more object identifiers from the external search engine, the database management system uses the retrieved object identifiers to retrieve one or more row identifiers from the index stored in the database managed by the database management system, and the database management system uses the retrieved row identifiers to retrieve one or more rows from the table stored in the database managed by the database management system.

2. The system of claim 1, wherein a user-defined function produces object identifiers for a lookup operation performed against the index stored in the database.

3. The system of claim 1, wherein the retrieved object identifiers match a search argument specified in a query.

4. The system of claim 1, wherein the retrieved object identifiers are mapped to the row identifiers stored in the index in the database to determine which rows can be retrieved from the table in the database.

5. The system of claim 1, wherein a function produces at least one object identifier from the external index for storage into the index in the database.

6. The system of claim 1, wherein the index in the database supports exact match lookup operations.

7. The system of claim 1, wherein the table stores non-traditional data.

8. The system of claim 1, wherein the table stores a link to non-traditional data.

9. A method of managing data in a computer-implemented database management system, comprising:

retrieving one or more object identifiers from an external index managed by an external search engine that supports content-specific search operations against an external database, using the retrieved object identifiers to retrieve one or more tow identifiers from an index stored in a database managed by a database management system that is related to search results returned by the external search engine, and using the retrieved tow identifiers to retrieve one or more tows from a table stored in the database managed by the database management system.

10. The method of claim 9, wherein a user-defined function produces object identifiers for a lookup operation performed against the index stored in the database.

11. The method of claim 9, wherein the retrieved object identifiers match a search argument specified in a query.

12. The method of claim 9, wherein the retrieved object identifiers are mapped to the row identifiers stored in the index in the database to determine which rows can be retrieved from the table in the database.

13. The method of claim 9, wherein a function produces at least one object identifier from the external index for storage into the index in the database.

14. The method of claim 9, wherein the index in the database supports exact match lookup operations.

15. The method of claim 9, wherein the table stores non-traditional data.

16. The method of claim 9, wherein the table stores a link to non-traditional data.

17. An article of manufacture embodying logic for a method of managing data in a computer-implemented database management system, the method comprising:

retrieving one or mote object identifiers from an external index managed by an external search engine that supports content-specific search operations against an external database, using the retrieved object identifiers to retrieve one or more row identifiers from an index stored in a database managed by a database management system that is related to search results returned by the external search engine, and using the retrieved row identifiers to retrieve one or more rows from a table stored in the database managed by the database management system.

18. The method of claim 17, wherein a user-defined function produces object identifiers for a lookup operation performed against the index stored in the database.

19. The method of claim 17, wherein the retrieved object identifiers match a search argument specified in a query.

20. The method of claim 17, wherein the retrieved object identifiers are mapped to the row identifiers stored in the index in the database to determine which rows can be retrieved from the table in the database.

21. The method of claim 17, wherein a function produces at least one object identifier from the external index for storage into the index in the database.

22. The method of claim 17, wherein the index in the database supports exact match lookup operations.

23. The method of claim 17, wherein the table stores non-traditional data.

24. The method of claim 17, wherein the table stores a link to non-traditional data.

* * * * *